(12) United States Patent
Wiskur

(10) Patent No.: US 7,325,357 B2
(45) Date of Patent: Feb. 5, 2008

(54) ACOUSTICAL FISHING LURE

(76) Inventor: Darrell D. Wiskur, 1811 Hudson La., Harrison, AR (US) 72601

( * ) Notice: Subject to any disclaimer, the term of this patent is extended or adjusted under 35 U.S.C. 154(b) by 0 days.

(21) Appl. No.: 10/756,230

(22) Filed: Jan. 13, 2004

(65) Prior Publication Data

US 2005/0150151 A1    Jul. 14, 2005

(51) Int. Cl.
*A01K 85/01* (2006.01)
(52) U.S. Cl. ..................... 43/42.31; 43/17.1
(58) Field of Classification Search ........... 43/42.31, 43/26.2, 42.37, 42.06, 17.1, 42.22, 43.14, 43/17.6; 84/402, 406, 410; D17/22
See application file for complete search history.

(56) References Cited

U.S. PATENT DOCUMENTS

| | | | | |
|---|---|---|---|---|
| 1,726,736 A | * | 9/1929 | Good ................. 43/17 |
| 1,906,791 A | | 5/1933 | Grossman |
| 2,189,853 A | * | 2/1940 | Zadek ............... 446/177 |
| 2,511,138 A | * | 6/1950 | Wood .............. 43/26.2 |
| 2,518,061 A | | 8/1950 | Lane |
| 2,530,008 A | * | 11/1950 | Fey ................ 43/26.2 |
| 2,552,730 A | | 5/1951 | Miller |
| 2,740,220 A | * | 4/1956 | Caplan ............. 43/17.6 |
| 2,763,954 A | * | 5/1956 | Bunker ............ 43/42.31 |
| 2,833,078 A | * | 5/1958 | Peltz .............. 43/42.31 |
| 2,909,863 A | | 10/1959 | Rector et al. |
| 2,927,391 A | * | 3/1960 | Herter ............. 43/17.1 |
| 3,047,972 A | * | 8/1962 | Taylor ................ 43/3 |
| 3,165,023 A | * | 1/1965 | Boynton ............. 84/406 |
| 3,393,465 A | * | 7/1968 | Powell .............. 43/17.6 |
| 3,535,812 A | * | 10/1970 | Creclius ............ 43/17.6 |
| 3,626,628 A | * | 12/1971 | Weimer ............ 43/42.22 |
| 3,728,811 A | * | 4/1973 | Weimer ............. 43/26.2 |
| 3,769,870 A | * | 11/1973 | Huber .............. 84/103 |
| 3,831,307 A | * | 8/1974 | Pittman ............ 43/42.31 |
| 3,894,350 A | * | 7/1975 | Parker ............ 43/42.31 |
| 3,909,973 A | * | 10/1975 | Fairbanks ......... 43/42.31 |
| 4,155,191 A | * | 5/1979 | Spivey ............ 43/42.31 |
| 4,163,338 A | | 8/1979 | Lucarini |
| 4,380,132 A | * | 4/1983 | Atkinson ............ 43/26.2 |
| 4,483,091 A | * | 11/1984 | Norlin ............ 43/42.31 |
| 4,571,874 A | * | 2/1986 | Smaw ............. 43/43.14 |

(Continued)

FOREIGN PATENT DOCUMENTS

CA    2417420 A1 *    7/2004

(Continued)

OTHER PUBLICATIONS

WordReference.com English Dictionary, "Definition of devoid" [online]. 2007 [retrieved on Sep. 11, 2007]. Retrieved from the Internet:<URL: http://www.wordreference.com/definition/devoid>.*

*Primary Examiner*—Darren W. Ark
(74) *Attorney, Agent, or Firm*—Haverstock, Garrett and Roberts LLP

(57) ABSTRACT

An improved fishing lure which produces, transmits and modulates high frequency vibrations. The high frequency tone wire vibration is actuated upon impact of a striker against the wall of an essentially watertight housing. As the striker oscillates within the housing, high frequency vibrations and sound waves emanate from the tone wire. This invention also includes a noisemaker component specifically designed using a tone wire and a striker which can be incorporated into existing fishing lures.

16 Claims, 3 Drawing Sheets

U.S. PATENT DOCUMENTS

| | | | | |
|---|---|---|---|---|
| 4,653,218 A * | 3/1987 | Margulis | ............... | 43/26.2 |
| 4,823,501 A * | 4/1989 | Standish, Jr. | ............... | 43/42.31 |
| 5,036,617 A * | 8/1991 | Waldrip | ............... | 43/42.31 |
| 5,144,765 A * | 9/1992 | Keeton | ............... | 43/42.31 |
| 5,201,784 A * | 4/1993 | McWilliams | ............... | 43/42.31 |
| 5,282,178 A * | 1/1994 | Hill et al. | ............... | 367/141 |
| 5,329,721 A * | 7/1994 | Smith | ............... | 43/42.22 |
| 5,497,581 A * | 3/1996 | Williams | ............... | 43/42.31 |
| 5,517,782 A * | 5/1996 | Link et al. | ............... | 43/42.31 |
| 5,561,938 A * | 10/1996 | Kato et al. | ............... | 43/42.31 |
| 5,661,922 A * | 9/1997 | Bonomo | ............... | 43/42.31 |
| 5,678,350 A * | 10/1997 | Moore | ............... | 43/42.37 |
| 5,890,315 A * | 4/1999 | Norton | ............... | 43/42.31 |
| 5,946,847 A * | 9/1999 | North | ............... | 43/42.31 |
| 6,155,000 A * | 12/2000 | Ravencroft | ............... | 43/42.31 |
| 6,199,312 B1 * | 3/2001 | Link | ............... | 43/42.31 |
| 6,233,864 B1 * | 5/2001 | Mathews et al. | ............... | 43/42.31 |
| 6,255,572 B1 * | 7/2001 | Moghaddam et al. | ............... | 84/410 |
| 6,301,822 B1 | 10/2001 | Zernov | | |
| 6,346,664 B1 * | 2/2002 | Shuen | ............... | 84/406 |
| 6,360,476 B1 * | 3/2002 | Anastacio | ............... | 43/42.31 |
| 6,408,565 B1 * | 6/2002 | Duncan | ............... | 43/42.06 |
| 6,417,763 B1 * | 7/2002 | Petruzzi | ............... | 340/392.1 |
| 6,523,297 B1 * | 2/2003 | Hair et al. | ............... | 43/42.2 |
| 6,581,319 B2 * | 6/2003 | West | ............... | 43/26.2 |
| 6,671,996 B1 * | 1/2004 | Ito | ............... | 43/42.31 |
| 6,684,556 B1 * | 2/2004 | Arbuckle et al. | ............... | 43/17.1 |
| 6,768,416 B2 * | 7/2004 | Petruzzi | ............... | 84/402 |
| 6,840,001 B1 * | 1/2005 | Cox | ............... | 43/42.31 |
| 7,009,098 B2 * | 3/2006 | Carter | ............... | 84/410 |
| 2003/0110678 A1 * | 6/2003 | Yong-Set | ............... | 43/42.22 |
| 2005/0034349 A1 * | 2/2005 | Dugger, II | ............... | 43/17.1 |

FOREIGN PATENT DOCUMENTS

| | | | |
|---|---|---|---|
| DE | 2943285 A1 * | 5/1981 | |
| DE | 10106188 A1 * | 8/2002 | |
| EP | 1413193 A1 * | 4/2004 | |
| JP | 9-163898 A * | 6/1997 | |
| JP | 2001-224281 A * | 8/2001 | |
| JP | 2002-218865 A * | 8/2002 | |
| JP | 2002-335816 A * | 11/2002 | |
| JP | 2003-204735 A * | 7/2003 | |
| JP | 2003-219765 A * | 8/2003 | |
| JP | 2004-65207 A * | 3/2004 | |
| JP | 2004-215609 A * | 8/2004 | |
| JP | 2004-261046 A * | 9/2004 | |
| WO | WO-97/08948 A1 * | 3/1997 | |

\* cited by examiner

ACOUSTICAL FISHING LURE

BACKGROUND OF INVENTION

This invention relates generally to fishing lures. More specifically, this invention relates to fishing lures that attract fish using high frequency and percussion sound waves.

Fishing lures come in many sizes, shapes and colors. Sophistication among fishing lures varies greatly ranging from a simple hook and sinker, to sophisticated spinner arrangements, all designed to attract fish in their own way. The purpose of any fishing lure is to attract a fish by imitating a creature which is a part of the normal diet of the fish, such as a worm, amphibian, or smaller fish. A problem associated with fishing lures is that, unlike live baits, fishing lures are unable to attract game fish by independent movement, except by continuous action imparted by rod, reel and line.

One set of prior art is based on the theory that different types of fish are attracted by different colors. This art consists of numerous lures of different, and sometimes quite exotic, colors, depending on the type of fish desired to be attracted. In a similar fashion, another set of prior art is based on the theory that fish are attracted by bright or shiny objects. This art includes lures of various configurations designed to reflect sunlight and to attract the attention of fish visually, by interplay of motion and light reflectance. Often the fish appear indifferent to the visual stimulation of these prior art lures and refuse to go after them. Moreover, by the nature of their environment, fish can not see very far. When the water is not very clear, the shiny reflection or bright colors of the lure are ineffective to attract the attention of the fish since they are unable to see them. Therefore, an improved scheme to attract fish is necessary.

Another set of prior art is based on the theory that fish are attracted by sound. As is well known, fish have a nerve system that is stimulated or activated by their lateral line response signals. The fish senses and picks up sound waves and high and low frequency vibrations by their lateral line, one of which is located on each side of their body, running from behind the gill to the base of the tail. These lateral lines roughly correspond to human ears. While it is understood that such organs do not hear sounds in exactly the same manner as humans, it is well known that such organs are sensitive to sound waves, particularly sound waves transmitted through the water. Likewise, as is well known, water provides an excellent medium for the transmission of sound waves. Numerous lures have been designed that include pieces and accessories that are positioned to physically contact each other and emit sounds with lure movement. Many presentations provide capsules or chambers that support rattles. Others provide metal weights and/or glass beads that are mounted to slide and to physically strike each other. Still others use a rapidly-vibrating spring for creating sound waves. In actual practice, however, water mutes sounds emitted from a lure by dampening movement of the sound making parts.

What is needed, therefore, is a fishing lure which not only provides visual stimulation, but also one which emits sound waves to attract fish that might otherwise be indifferent to the fishing lure that is merely visible for a short distance. Further, it is necessary that the fishing lure maintain the sound waves to attract fish not in the exact vicinity. There is therefore a need and market for a fishing lure which is both visible and audible over a sustained period of time with a suitable sound to attract fish which overcomes the shortcomings of the prior art.

It is an object of the present invention to provide a fishing lure apparatus which is capable of attracting fish based on their sensitivity to sound.

In accordance with this object, this invention is intended to provide a lure that can produce significant sound with less imparted motion or velocity of the lure, allowing longer exposure of the lure in the strike zone.

This invention is further intended to provide an improved fish lure which transmits sound waves through the water and produces sustained vibrations without requiring repeated operations such as tugging or jerking on the fishing line.

Additionally, this invention is intended to provide a lure which is of simple construction in which a single component replaces multiple internal weights or rattles, sound chambers and weight pockets.

This invention is also intended to provide a lure in which the range of voices far exceeds the sounds available with conventional internal weights and rattles.

This invention is also intended to create a lure in which a "family" of voices are available for any given lure body design, making it possible to produce each lure body in several voice variants.

Still other objects, advantages, distinctions and alternative constructions and/or combinations of the invention will become more apparent from the following description with respect to the appended drawings. Similar components and assemblies are referred to in the various drawings with similar alphanumeric reference characters. This description should not be literally construed in limitation of the invention. Rather, the invention should be interpreted within the broad scope of the further appended claims.

SUMMARY OF THE INVENTION

The present invention is a fishing lure which produces, transmits and modulates high frequency vibrations. This unique-to-the-field design structure is the embodiment for producing, transmitting, and modulating high frequency vibrations directly off a tone wire. It is the only known noisemaker or lure voice component specifically designed using a tone wire with a reverberating or actuating striker to produce and transmit high frequency vibrations and sound resonating from, or off, the tone wire first, and then resonating to the surroundings. The high frequency vibration aspect of the tone wire produces a different resulting effect when compared to other noise making devices, and it improves upon the percussion and low frequency vibrations found in existing fishing lures. This invention is much different from the low frequency vibrations or secondary percussion rattles or clicks found in previous lures. This invention produces and transmits high frequency vibration tones or sounds. The tone wire is like a mechanical vocal cord from which the voice tone sounds off. The noisemaker mechanically produces sound that is perceived to be life-like because of the erratic change in modulation and fluctuation of the high frequency sound waves coming off the tone wire and then transmitted to the sensory reception of any subject having the ability to receive sound waves or feel their vibrations.

The high frequency tone wire vibration is actuated upon impact of a tone wire's reverberating striker against the wall of an essentially watertight housing. Inside the housing of the fishing lure, one end of the tone wire, or the foot, is affixed, while the other end, or head is equipped with a striker or weight that is free to move within the housing. When the housing is moved, the natural motion of the internal striker off balances, flexes, and bows the tone wire.

In turn the striker is forced or pushed off axis center further flexing the tone wire. Such movement sends the striker into collision with the housing. This impact, an instantaneous striker stop and recoil, transfers the impact shock from the striker to the tone wire causing the tone wire to flex in the other direction, sending the striker to the other side of the housing. The continuous action of striker impacts, sudden stop of forward motion, and change of direction, instantaneously warps the wire from straight axis to arc, to wave shape, and simultaneously transfers its shock force, throwing high frequency vibrations and reverberation overtones onto the already vibrating tone wire. This continuous reverberation, upon reverberation modulates the tone wire vibrations. Also at each repercussion impact transfer to the wire, the wire can be in a different flex position and state of bend. This kind of action is what gives the high frequency tone vibrations such a distinct sound. While the striker reverberation action is going on, the vibration frequency and oscillation is continuously being interrupted by its own repercussion shock changing or modulating reverberation overtones upon the tone wire already in the action of transmitting high frequency vibrations set upon it. All the above described high frequency actions take place in microseconds.

The modulation of tone character can be distinguished by the choice of materials used in the construction of the lure. Each tone wire has its own unique voice characteristic by its certain component combinations design. In use, on retrieval through the water, the lure produces a different pattern of its character of sound on every retrieve. The voice housing and or lure body moves through the water differently on every retrieve. The actuating lure body movements produce a constant change in the degree of impact, or shock, the striker imparts to the tone wire by its movement, causing the life like modulation of vibration.

The primary function of the present invention as a component of a fishing lure is to mechanically produce and transmit modulating, fluctuating sound waves of high frequency vibrations emanating off the component tone wire, out and into the fields of physical environment it occupies. The tone wire simultaneously transmits high frequency post-axial vibrations onto its host acoustical housing, transmitting variable complex high frequency tones off the grounded foot of the tone wire, which sonicates residual energy to any surrounding receptors.

The tone wire housing is specifically designed for restricting the space in which the head of the tone wire is able to oscillate or move, without jamming or stopping the movement and vibration of the tone wire. Close tolerance space restriction is designed to control the striker orbit action against the housing wall to generate the tone wire's high frequency vibrations. The measurements for the housing are dependent on the size, shape and weight of the tone wire and the striker used in combination to produce an individually distinct voice print of identifiable modulating high frequency tones. The size and density of the chamber body also affects the high frequency vibration transmission to water.

In some cases, it is desired to use the present invention in a lure sized larger than the orbit of the striker provided by the length of the tone wire. In this situation, the striker weight can cause a bend back of the tone wire, devastating the production of high frequency sound waves. To prevent a bend back of the tone wire, a restrictor is installed in the housing based on the circumference size and shape of the housing near the striker. The restrictor is designed specifically to control the striker movement by restricting the containment space of the striker during oscillating hits to maintain the tone wire's effectiveness in producing high frequency sounds by preventing bend backs on the tone wire.

Another way to restrict the tone wire and prevent bend back in the tone wire is by the use of an open or closed noisemaker inserted into an existing fishing lure. The noisemaker consists of a shell or horn surrounding the tone wire and the striker. The tone wire is attached at its foot to the horn and the striker is free to move and hit the walls of the horn. A closed noisemaker has a substantially watertight horn, and when placed in any existing lure, it converts that lure to a high frequency vibration and sound producing lure. An open noisemaker does not have a essentially watertight horn, and when it is placed in a substantially watertight lure, it converts that lure into a lure with the high frequency vibration and sound producing qualities of the present invention.

This present design for a mechanical harmonic noisemaker or voice fishing lure is more effective in producing the high frequency sound waves to mimic natural live fluctuating sounds compared to any known electronic type of noisemaker because it produces different and constantly changing individual harmonic patterns of high frequency vibrations each and every time the apparatus is activated by movement. The lure's movement and, therefore its voice pattern is never exactly the same when in use. Each use of the lure produces a different voice pattern—but always within each individual voice character of tone range produced by the physics of its own individual components with its certain design combinations and material composition. This varying and modulating frequency makes the lure seem natural and alive to the predator. Also, depending on the choice of materials, the tones can be made to have a wide range of frequency sounds for different lures.

The present invention can be appropriated to every major category of hard baits to lure both fresh and salt water game fish. The noisemaker can fit in most lures, including surface lures, swimming lures, diving lures, stick baits, jig lures, spinner baits, and soft bait inserts. The size of the voice horn can be made to fit as small as one inch to large salt water sized chambers.

BRIEF DESCRIPTION OF THE DRAWINGS

FIG. 2 depicts an open noisemaker embodiment showing a horn formation around the striker and tone wire.

FIG. 6 depicts a closed noisemaker embodiment showing a horn formation around the striker and tone wire.

DETAILED DESCRIPTION OF THE INVENTION

Figure 1:
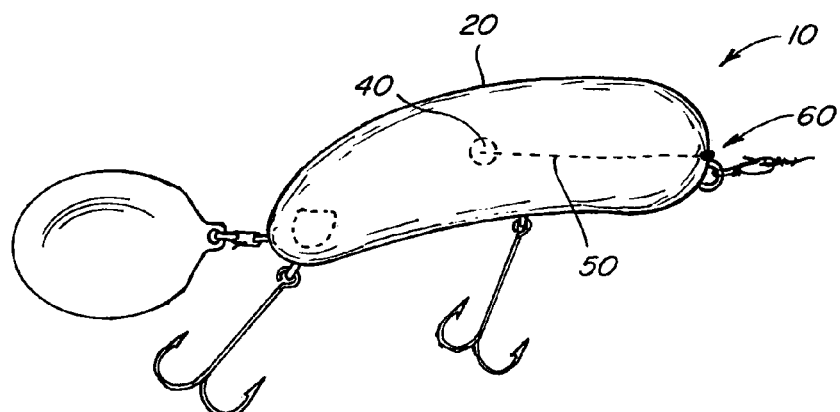
FIG. 1 is a side view of a representative fishing lure showing the position of one embodiment of a noisemaker.

FIG. 1 shows a representative fishing lure 10 having an essentially watertight hollow housing 20. Inside the housing is a striker 40 and a flexible member or tone wire 50. The tone wire 50 is attached to the housing 20 at the foot 60 of the tone wire. At rest, the tone wire 50 preferably holds the striker 40 at, or near, the center of the housing 20. The tone wire 50 is long enough and flexible enough to allow the striker 40, when moved, to collide with the inside of the housing 20. In the presently preferred embodiment, a steel tone wire can be used as the tone wire 50 and the striker 40 can be a steel weight.

The present invention is actuated by the movement of the lure 10 through the water. With this design, two distinct types of fish-attracting noises are produced. These two sounds are complex harmonic high-frequency vibrations produced by the vibration of the tone wire 50 initiated to action by the percussion impact of the striker 40 oscillating on the end of a tone wire 50. The action of the striker 40 hitting the lure housing 20 transmits strong shock waves that are amplified by the housing 20. The same impact shock is also directly transmitted to the tone wire 50. The tone wire 50 is attached at its foot 60 to the lure body 20 to resonate and transmit strong, harmonic reverberating sound waves. These percussion and harmonic vibrations are the types of vibrations that affect and stimulate fish sensory organs.

The high frequency vibration is the result of the movement of the lure housing 20 through the water. Movement of the housing 20 acts to move the tone wire fixed foot 60, which results in the bending or bowing of the tone wire 50. By the tone wire 50 action, the striker 40 is pushed off axis center, further flexing the tone wire 50, which gains momentum by the increased forced oscillating movement of the striker 40 from the center of its moving housing 20. Such movement sends the striker 40 into contact with the housing 20. It is the sudden impact, an instantaneous striker 40 stop and recoil, that transfers the impact shock to the tone wire 50 to flexing high frequency vibrations upon the tone wire 50, displacing the air around the tone wire 50 in its housing 20, and producing the high frequency sound waves. The continuing action, as the lure 10 moves, of striker 40 impacts, sudden stop in forward motion and change in direction, instantaneous warp of the tone wire 50 from straight axis to arc, to wave shape, and simultaneous transfer of its shock force, throws high frequency vibrations and reverberation overtones onto the already vibrating tone wire 50. This reverberation upon reverberation modulates the tone wire 50 vibration. Also, at each repercussion impact transfer to the tone wire 50, the tone wire 50 is in a different flex position and state of bend. That kind of action is what gives the high frequency tone wire 50 vibration such a distinct sound. While the striker 40 reverberation action is going on, the vibration frequency and oscillation is continuously being interrupted by the striker's 40 own repercussion shock change or modulating reverberation upon the tone wire 50 already in the action of transmitting or sounding off the high frequency vibrations set upon it. All the above described high frequency actions take place in microseconds. In use, the lure 10 produces a different pattern of its character of sound on every retrieve because the lure 10 moves through the water differently on every retrieve. The actuating housing 20 movements produce the constant change in the degree of impact the striker 40 imparts to the tone wire 50 by its movement, causing the modulation of vibration.

High frequency vibration of the tone wire 50 is maintained by the sudden stop and start action of the oscillating striker 40 colliding against the housing wall 20 which is also moving and adding to the constant change of equilibrium of the tone wire 50. The vibration frequency is in constant change of speed and intensity because it is directly affected by the action of the striker 40 as it throws high frequency shock warps upon the varying lengths of the waving arcs on the flexing tone wire 50. The striker 40 action, with every move, adds more complex vibration frequencies. These high frequency vibrations received by the sensory organs and lateral line of predatory fish give them the perception of live bait feel, so they respond to complex vibrations of high frequency sound waves.

When the inside dimensions of the lure body 20 are large relative to the arc length of the tone wire 50, the weight of the striker 40 may cause the tone wire 50 to bend back on itself as the striker 40 swings between the lure housing walls 20, seriously diminishing the effectiveness of the tone wire 50 to produce high frequency vibrations. In developing a tone wire oscillating orbit restriction design, the circumference size and shape of the tone wire's acoustical housing near the striker is taken into account. The restrictor is designed specifically to control the striker movement on the tone wire, by restricting the containment space of the striker for hits during oscillation, to prevent fatal damage to the tone wire's action by preventing bend backs and jamming action.

For a variety of high frequency tone transmissions, it is absolutely necessary to physically employ specifically designed restricted space or acoustical housing for deflecting or controlling any striker that would be of sufficient sizes that it could, by inertia forces, overpower the tone wire's strength ability to hold it forward on its axis, so as to reverse or bend back upon the tone wire body, permanently bending the tone wire and/or jamming its striker between the tone wire and housing wall. This restrictive housing would be applicable to any combination of tone wire components that could be adversely affected by the great inertia force of a striker mass moving in one direction, then suddenly at high speed changing directions from forward to reverse while simultaneously oscillating around its axis side to side. These inertia forces are extremely powerful and will force the striker backward toward its attached end, when there is a sudden reverse in direction, sending, by force, the striker back upon its tone wire and behind its normal position or length of orbit contact with its housing wall.

Figure 2A:
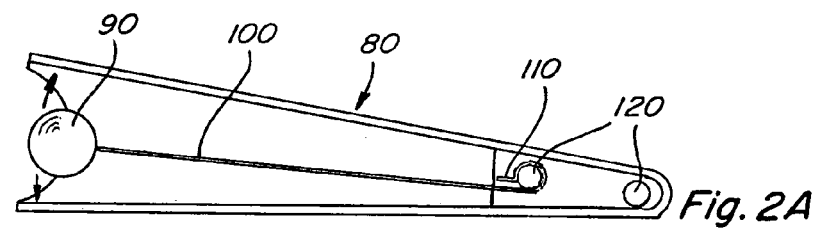
FIG. 2A is a bottom view of the plug half of the noisemaker.
Figure 2B:
FIG. 2B is a side view of the cap half of the noisemaker.
Figure 2C:
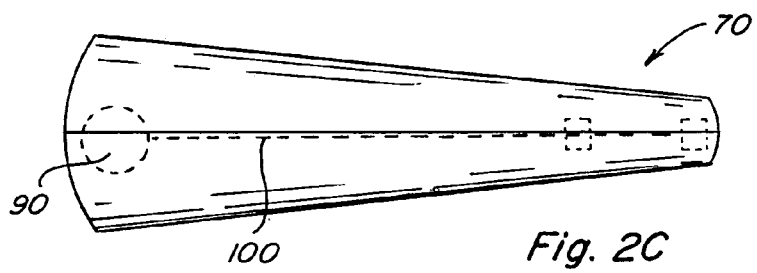
FIG. 2C is a side view of an assembled open noisemaker.

FIG. 2 shows an embodiment of a restrictor called an open noisemaker 70 that can be used to restrict the striker orbit. The open noisemaker 70 is shown in two parts. FIG. 2A shows the plug half of the body 80 which includes the striker 90 on the tone wire 100 which is attached at its foot 110 with a wire shaped set groove and weld plugs 120. FIG. 2B shows the cap half of the body 130 which includes plug receiver holes 150. FIG. 2C shows the result after the plug half of the body 80 is inserted into the cap half of the body 130, making sure to line up the weld plugs 120 with the plug receiver holes 150. When the noisemaker 70 is moved, the striker 90 impacts the walls of the horn formed when the plug half of the body 80 and the cap half of the body 130 were joined, causing the high frequency sound waves to resonate off the tone wire 100 as described above.

Figure 3:
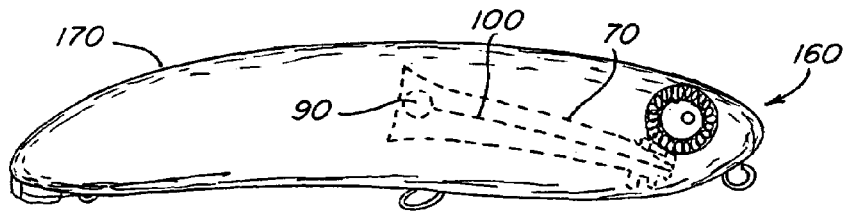
FIG. 3 is a side view, in partial cut-away, depicting a representative fishing lure containing a noisemaker embodiment with the noisemaker horn of FIG. 2C used in the housing.

An open noisemaker 70 as shown in FIG. 2C can then be used as an insert to an existing lure that is essentially watertight to create a lure that emits high frequency sound waves without the risk of the striker 90 bending back the tone wire 100. FIG. 3 shows a such a fishing lure 160 using the open noisemaker 70 as a restrictor. The previously assembled horn 70 is placed in an essentially watertight lure housing 170, transforming the traditional lure to a high frequency vibration and sound producing lure 160. The lure 160 is not limited in size by the arc length created by the tone wire 100 because the open noisemaker 70 restricts the striker 90 from causing a bend back on the tone wire 100 which leaves the tone wire 100 free to produce high frequency vibrations and sound waves.

Figure 4:
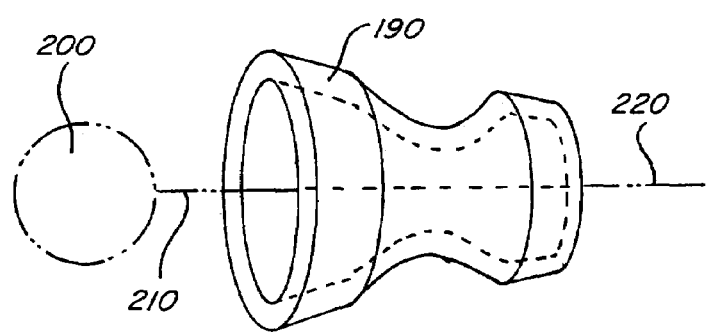
FIG. 4 is a side view depicting a representative noisemaker embodiment of a cone ring restrictor that can be mounted within a lure housing.

FIG. 4 shows a noise maker embodiment called a cone ring restrictor 190 that prevents the striker 200 from swinging too far towards the foot 220 of the tone wire 210 to cause a bend in the tone wire 210. The cone ring resistor 190 is created by a narrowing of the resistor around the tone wire 210 near the striker 200.

Figure 5:
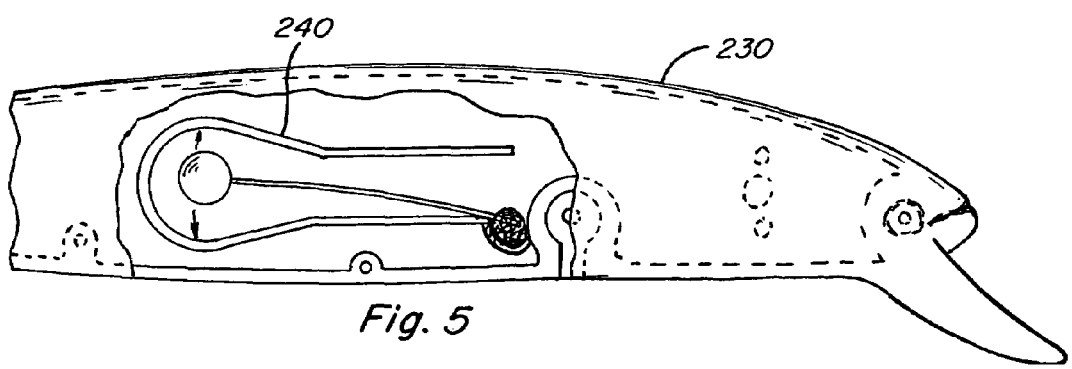
FIG. 5 is a side view, in partial cutaway, depicting a representative fishing lure containing an alternate restrictor embodiment.

FIG. 5 depicts an essentially watertight lure housing 230 with yet another embodiment of a restrictor 240 as it is used in the present invention.

Figure 6A:
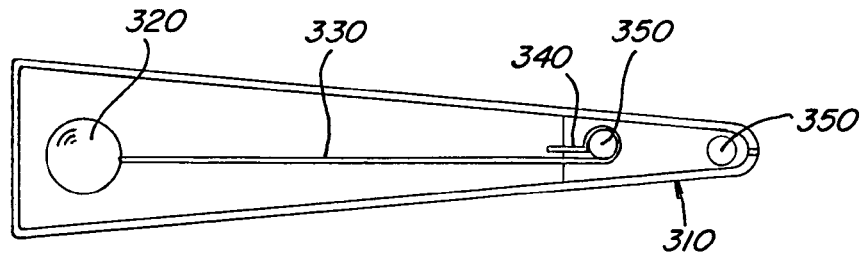
FIG. 6A is a bottom view of the plug half of the noisemaker.
Figure 6B:
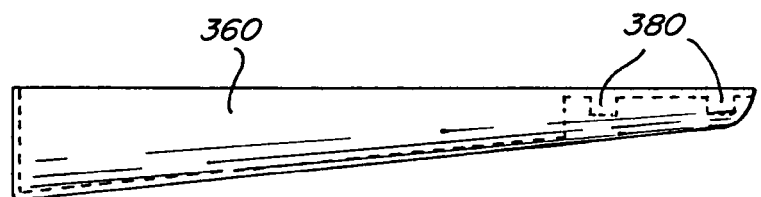
FIG. 6B is a side view of the cap half of the noisemaker.
Figure 6C:
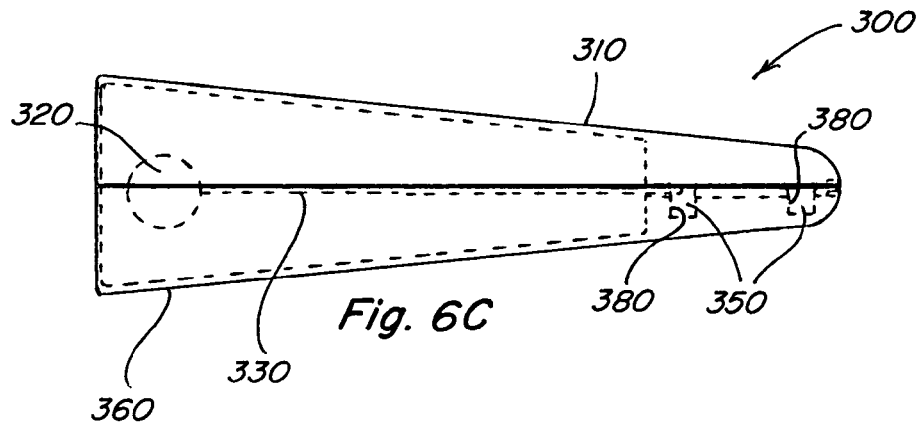
FIG. 6C is a side view of an assembled closed noisemaker.

FIG. 6 shows an embodiment of a closed noisemaker 300. The closed noisemaker 300 is shown in two parts. FIG. 6A shows the plug half of the body 310 which includes the striker 320 on the tone wire 330 which is attached at the foot 340 with a wire shaped set groove and weld plugs 350. FIG. 6B shows the cap half of the body 360 which includes plug receiver holes 380. FIG. 6C shows the result after the plug half of the body 310 is inserted into the cap half of the body 360, making sure to line up the weld plugs 350 with the plug receiver holes 380 and connecting the two parts to create an essentially watertight housing for the noisemaker. When the noisemaker 300 is moved, the striker 320 impacts the walls of the plug half 310 and the cap half 360 of the body causing the high frequency sound waves to resonate off the tone wire 330 as described above. A closed noisemaker 300 as shown in FIG. 6C can be inserted into an existing fishing lure that may not be watertight. In addition, the closed noisemaker 300 also eliminates the need for an additional restrictor within a lure. The closed noisemaker 300 is placed inside a traditional lure, transforming the traditional lure to a high frequency vibration and sound producing lure.

Figure 7:
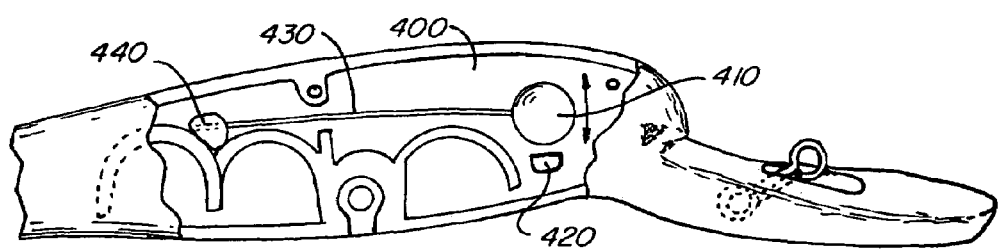
FIG. 7 is a side view, in partial cut-away, depicting a representative fishing lure showing a component mounted within the housing.

In FIG. 7, the striker 410 is placed so it can contact another component 420 on the inside of the housing, to cause extending action from the lure housing 400 and to cause the production of various sounds in response to the impingement of striker 410 and a component 420. The component may represent one or more metal or rubber pieces along the inside of the lure body 400. The purpose of the component 420 is to vary the impact of the striker 410, thereby varying the high frequency vibrations emanating from the tone wire 430. The component 420 may also represent a tuning fork, such that when hit with the striker 410, the tuning fork provides additional high frequency vibrations. If the tuning fork is affixed to the lure housing 400, the tone wire 430 can actually be mounted in the center of the tuning fork. On some impacts the striker 410 would hit the tuning fork, and on other hits, the striker 410 would hit the lure housing 400, resulting in varying high frequency vibrations from both the tone wire 430 and the tuning fork.

Figure 8:
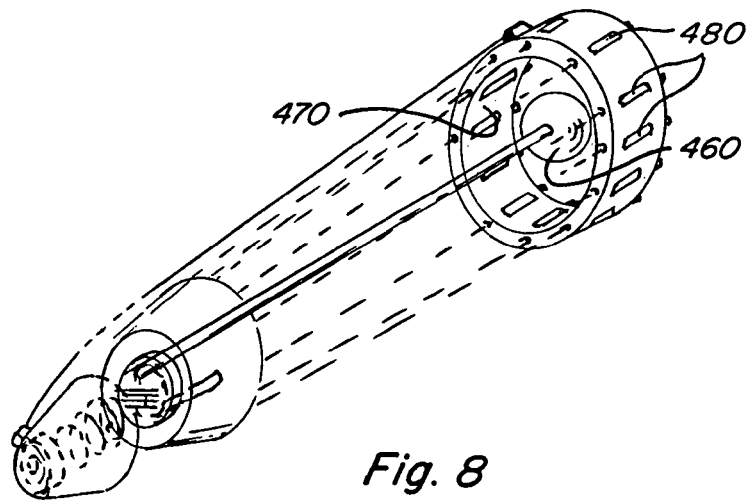
FIG. 8 is a side view, in partial cutaway, of an embodiment of a fishing lure insert showing a striker that will impinge upon an electronic pad ring.

FIG. 8 shows another embodiment of the present invention that employs electronics to produce varying high frequency sounds. Inside the lure housing 450, the striker 460 is placed so it can impinge upon a ground pad ring 470 with sound activators 480. Varying sounds are actuated when the striker 460 contacts a particular sound activator 480. As the lure body 450 is moved through the water, the striker 460 impacts different sound activator spots 480 on the ring. As each spot 480 is impacted, its particular sound is activated.

Location of the foot of the tone wire has some, but not tremendous effect on the high frequency sounds produced by the lure. Any position of the foot is acceptable, however, mounting the foot of the tone wire near the front of the lure seems to produce the most action on the tone wire, resulting in longer and louder high frequency sound vibrations.

Each tone wire has its own unique tone character by selection of its certain component combination design. Different combinations of striker weights, sizes and shapes, combined with different size, length, gauge, tensile strength of stainless steel wires or microbands (ultra-flat band or strip for high frequency vibration) provide a different family of tones the lure can produce. The striker and tone wire arrangement can be adapted to fit virtually any lure housing because it can be made as small or as large as necessary to fit the interior of most any fishing lure. In addition, a single lure housing can be adapted to produce any number of sounds by varying the striker and tone wire arrangement. If desired, one could create a set of lures, identical in shape and size on the outside, that produces an entire family of sounds by changing the striker and tone wire combinations inside the lures. Essentially, any changes to the striker, the tone wire, the restrictor, or the housing have some effect on the high frequency vibrations and sound waves produced by the fishing lure according to the present invention.

For example, a BB sized lead striker attached to a 1½" wire length of 0.203 mm diameter stainless steel wire with the foot of the tone wire welded at the base of acoustical chamber 1⅝" in length with the head wall restrictor and a deflector rim circumference at a 20 degree angle to the axis head's flexed position contact orbit on the chamber mouth wall would produce a distinctly different measurable high frequency tone than that would be produced by component assemblies that employed a combination of different sizes and or weights, tone wire sizes, and or striker shapes, or component compositions. Also significant is the housing rim deflector angle, and shape of the head restrictor acoustical chamber, its circumference size, length, and material composition. Varying these components will also affect the re-transmission of the high frequency vibrations off the originating tone wire.

Although the invention has been described in terms of specific embodiments and applications, persons skilled in the art can, in light of this teaching, can generate additional embodiments without exceeding the scope or departing from the spirit of the claimed invention. In addition, specific features of the invention are shown in some drawings and not in others for convenience only, as each feature may be combined with any or all of the other features in accordance with the invention. Accordingly, it is to be understood that the drawings and description in this disclosure are proffered to facilitate comprehension of the invention and should not be construed to limit the scope thereof.

What is claimed is:

1. A noisemaking device that produces high frequency vibrations and sound waves in response to movement of the device comprising:

an essentially watertight housing defining an interior compartment with an inside surface, a flexible, essentially straight tone wire with a first and a second end, said first end attached at said inside surface of the housing, said second end extending horizontally into said interior compartment defined by the housing, a contact surface with a first end and a second end larger than the first end within said interior compartment defined by the housing, said wire attached near said first end of said contact surface and a weighted member fixedly attached to said flexible tone wire, such that in response to movement of said device, said weighted member strikes said contact surface near the second end causing said flexible tone wire to produce high frequency vibrations, said contact surface being devoid of cushioning material that would absorb energy or dampen vibrations produced on said wire when said weighted portion strikes said contact surface, said weighted member and said flexible tone wire sized to provide tension on said wire without significant flexure of said wire when in a static condition, and to limit movement of said weighted member within the housing to an arclike path that prevents bending of said flexible tone wire when the device is moved, and subsequent striking of said contact surface by said weighted member producing more complex high frequency vibrations on said wire.

2. The noisemaking device of claim 1 wherein said contact surface is said inside surface of said housing.

3. A fishing lure including the noisemaking device of claim 2.

4. A fishing lure including the noisemaking device of claim 1.

5. A fishing lure that produces high frequency vibrations and sound waves as the lure moves comprising:

an essentially watertight cavity therein substantially devoid of aqueous liquid, an elongated essentially straight flexible tone wire with a free first end and a second end fixedly disposed within said essentially watertight cavity, said free first end extending horizontally and being movable within said essentially watertight cavity, a contact surface associated with said essentially watertight cavity, said contact surface flared from a smaller size at said fixedly disposed second end to a larger size at said free first end, and a weighted portion along said elongated flexible tone wire at a position to impinge said contact surface as the flexible tone wire is flexed, said weighted portion providing tension on said wire without causing significant flexure of said wire when the fishing lure is in a static condition, said contact surface sized and shaped to allow essentially arclike movement of said weighted portion on said flexible tone wire, said contact surface sized and shaped to restrict the arclike movement of said weighted portion to prevent bending of said flexible tone wire, said contact surface being devoid of cushioning material that would absorb energy or dampen vibrations produced on said wire when said weighted portion impinges said contact surface, movement of the lure effecting flexure of said flexible tone wire and impingement of said weighted portion on said contact surface producing, on said wire, high frequency vibrations and high frequency sound waves, and subsequent impingement of said weighted portion and said contact surface producing more complex high frequency vibrations on said wire.

6. The lure of claim 5 wherein said contact surface is said essentially watertight cavity.

7. The lure of claim 6 wherein said second end of said flexible tone wire is fixedly disposed within said essentially watertight cavity generally near a front end thereof.

8. The lure of claim 6 wherein said second end of said flexible member is fixedly disposed within said essentially watertight cavity generally near a rear end thereof.

9. The lure of claim 6 wherein said second end of said flexible member is fixedly disposed within said essentially watertight cavity generally near a center thereof.

10. The lure of claim 5 wherein said weighted portion attached to said wire is a metallic member, said weighted portion being moveable within said essentially watertight cavity when said essentially watertight cavity is moved in space or in water.

11. The lure of claim 5 wherein said contact surface is sized and shaped to restrict the movement of said weighed portion wherein said contact surface is generally more narrow near the fixedly disposed second end of the flexible tone wire than near the free first end of the flexible tone wire thereby generally maintaining the elongated shape of said flexible tone wire.

12. A fishing lure that produces variable high frequency sound waves within a surrounding body of water, comprising:

a body including an interior generally watertight compartment having an inner surface and a wire attachment point about said inner surface, a generally straight flexible wire of a generally uniform diameter, of a length L, and of a given tensile strength, and having first and second ends, said first end of said wire fixedly secured to said body at said wire attachment point, said wire extending generally horizontally from said wire attachment point within said watertight compartment, said wire having a weight secured at said second end thereof forming a weighted second end to tension said wire without effecting flexure of said wire sufficient to cause said weight to rest against said inner surface of said watertight compartment when said body is at rest in a quiescent state, said weighted second end of said wire remaining distanced from said inner surface within said watertight compartment when said body is at rest in a quiescent state, said watertight compartment sized and configured to prevent bend-back of said wire when said wire is caused to flex and vibrate, said watertight compartment including a flared end portion about said weighted second end of said wire sized and configured to permit flexure of said wire and arcuate movement of said weighted second end within said watertight compartment without contacting said inner surface as said body is subjected to minor movements and to permit increased flexure of said wire and greater arcuate movement of said weighted second end within said watertight compartment to effect contact of said weight at said second end of said wire with said inner surface of said watertight compartment sufficient, in terms of the tensile strength of said wire, to impart a force to said weight and therethrough to said wire to establish a sustained vibration on said wire when said body is subjected to a greater movement, said wire being of such diameter and tensile strength as to essentially maintain said weight so distanced from said inner surface when said body is in a quiescent state, to permit increasingly greater flexure thereof without effecting flexure sufficient to cause said weight to contact said inner surface of said watertight compartment in response to increasingly greater movement of said body from said quiescent state, and to permit flexure sufficient to permit said weight to contact said inner surface of said compartment at points of contact under certain given conditions of movement of said body, said points of contact of said weight along said inner surface of said watertight compartment being devoid of cushioning material that would absorb the impact of said weight at said contact points to dampen the force of impact and the rebound of said weight from said contact points upon impact, movement of said body within a surrounding body of water effecting displacement of said weighted second end of said wire relative to said secured first end of said wire and effecting vibratory flexure of said wire, said vibratory flexure effecting the generation of high frequency sound dependent upon said length L of said wire, the tensile strength of said wire, and the diameter of said wire, said weight and said inner surface of said watertight compartment being of materials such that movement of said weight into contact with said inner surface of said compartment effects the rebound of said weight from said contact points along said inner surface and introduces counter-flexure and vibration into said wire to effect the transmission of an energy wave along said wire from said second weighted end towards said first fixed end and subsequent further flexure and vibration of said wire as said energy wave reflects between said first and second ends thereof, said vibration of said wire producing a sustained musical tone, continuing movement of said body within the surrounding body of water effecting continuing vibratory movement and flexure and counter-flexure of said wire and vibratory responses in said body to impacts of said weighted second end of said wire at said contact points and a resulting in generation and output by said fishing lure of a continuously changing high frequency sound waveform within the surrounding body of water.

13. The fishing lure of claim 12 wherein said wire is tone wire.

14. The fishing lure of claim 12 wherein said wire is steel wire.

15. A fishing lure comprising:

a body including a watertight compartment therein having an inner surface and a wire attachment point on its inner surface, an essentially straight flexible tone wire of a generally uniform diameter and of a length L and having first and second ends, said first end of said tone wire secured to said wire attachment point to extend generally horizontally from said wire attachment point within said watertight compartment, said tone wire having a weight secured at said second end thereof forming a weighted second end to tension said tone wire without effecting flexure of said tone wire sufficient to cause said weight to rest against said inner surface of said waterproof compartment when said body is at rest in a quiescent state, said weighted second end of said wire remaining distanced from said inner surface within said watertight compartment when said body is at rest in a quiescent state, said watertight compartment being flared about said weighted second end of said wire to permit flexure of said tone wire and movement of said weighted second end within said compartment without contacting said inner surface as said body is subjected to minor movements, said tone wire being of such diameter and tensile strength as to essentially maintain said weight so distanced from said inner surface when said body is in a quiescent state, to permit increasingly greater flexure thereof in response to increasingly greater movement of said body from said quiescent state, and to permit flexure sufficient to permit said weight to contact said inner surface of said compartment at points of contact under certain given conditions of movement of said body, said points of contact of said weight along said inner surface of said watertight compartment being devoid of cushioning material that would absorb the impact of said weight at said contact points and dampen the force of impact and the rebound of said weight from said contact points upon impact, movement of said body effecting displacement of said weighted second end of said tone wire relative to said secured first end of said tone wire and effecting vibratory flexure of said tone wire, said vibratory flexure effecting the generation of a high frequency sound wave dependent upon the length L of said tone wire, the tensile strength of said tone wire, and the diameter of said tone wire, said weight and said inner surface of said watertight compartment being made of materials such that movement of said weight into contact with said inner surface of said compartment effects the rebound of said weight from said contact points along said inner surface and introduces counter-flexure into said tone wire, said non-dampened impact of said weighted second end of said tone wire at said contact points effecting vibratory responses in said body to said impact, said vibratory responses in said body and said vibratory flexure of said tone wire interacting with one another to effect generation of a more complex sound wave, continuing movement of said body within a body of water effecting continuing vibratory movement and flexure and counter-flexure of said tone wire and vibratory responses in said body to impacts of said weighted second end of said tone wire at said contact points and the generation by said fishing lure of a continuously changing frequency waveform.

16. A method of attracting fish including the steps of:

affixing a weighted member along a relatively straight flexible elongated tone wire of sufficient strength to support said weighted member without significant flexure of said wire when said wire is oriented horizontally and in a static condition, attaching one end of the flexible elongated tone wire inside an essentially watertight cavity defined by a flared housing sized and shaped such that motion of said weighted member causes said weighted member to impact said housing when said flexible tone wire is in a state of flex without causing a bend on said flexible tone wire, said housing being devoid of cushioning material that would absorb energy or dampen vibrations produced on said wire when said weighted member impacts said housing, attaching said housing to a fishing rod and reel, casting said housing into said water containing fish and moving said fishing rod and reel so that the housing moves in the water.

* * * * *